United States Patent
Doerrfuss et al.

(10) Patent No.: US 8,690,445 B2
(45) Date of Patent: Apr. 8, 2014

(54) ROLLING BEARING ARRANGEMENT

(75) Inventors: Florian Doerrfuss, Herzogenaurach (DE); Thorsten Biermann, Wachenroth (DE); Fritz Wiesinger, Heilsbronn (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 102 days.

(21) Appl. No.: 13/241,661

(22) Filed: Sep. 23, 2011

(65) Prior Publication Data

US 2012/0106884 A1 May 3, 2012

Related U.S. Application Data

(60) Provisional application No. 61/407,123, filed on Oct. 27, 2010.

(51) Int. Cl.
*F16C 33/30* (2006.01)

(52) U.S. Cl.
USPC .......................................... 384/493; 384/557

(58) Field of Classification Search
USPC ......... 384/535, 581, 611, 620, 570, 563, 564, 384/517, 519, 557, 493
See application file for complete search history.

(56) References Cited

U.S. PATENT DOCUMENTS 5,028,152 A 7/1991 Hill et al.
2009/0080824 A1* 3/2009 Joki et al. ...................... 384/557

FOREIGN PATENT DOCUMENTS

DE 4221802 A1 * 1/1994 ............... G12B 7/00

* cited by examiner

*Primary Examiner* — Alan B Waits
(74) *Attorney, Agent, or Firm* — Lucas & Mercanti, LLP

(57) ABSTRACT

A rolling bearing arrangement, which has at least one angular contact rolling bearing arranged within a housing and at least one lash compensation element that is supported axially in one direction on the housing and is capable of being biased against a bearing ring of the angular contact rolling bearing with the bearing ring being axially movable relative to the housing, and a U-shaped ring which has two radially opposing legs directed in an axial direction. The U-shaped ring rendering the lash compensation element radially immovable by positive engagement while being guided on the bearing ring of the angular contact rolling bearing for axial displacement relative to the bearing ring, and the axial section of the bearing ring projecting axially between the legs of the ring profile.

10 Claims, 1 Drawing Sheet

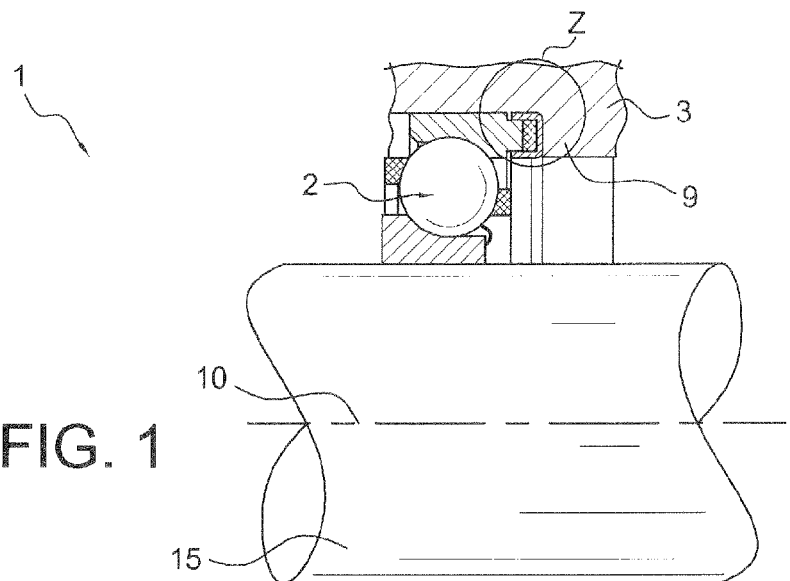
FIG. 1
FIG. 1a
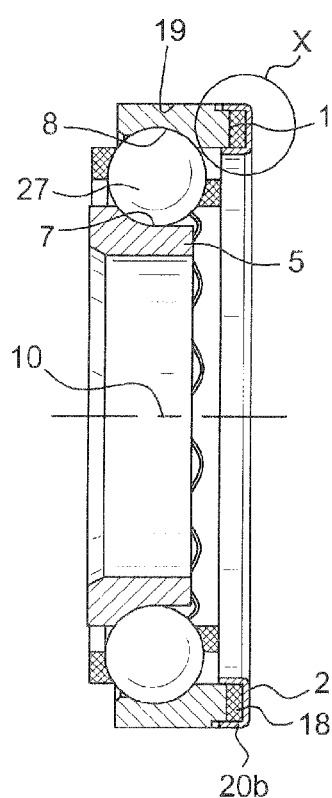
FIG. 2
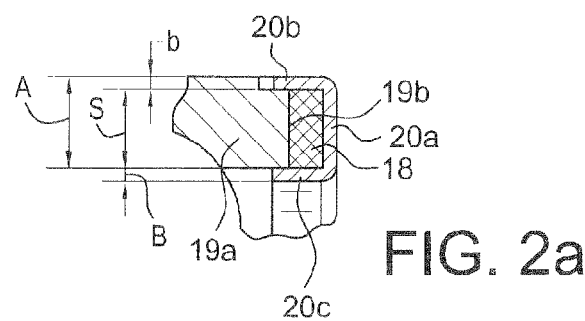
FIG. 2a

ROLLING BEARING ARRANGEMENT

CROSS-REFERENCE TO RELATED APPLICATION

This application claims the priority of U.S. 61/407,123 filed on Oct. 27, 2010, which is incorporated herein by reference.

FIELD OF THE INVENTION

The invention concerns a rolling bearing arrangement, which has at least one angular contact rolling bearing within a housing and at least one lash compensation element that is supported axially in one direction on the housing and is capable of being biased against a bearing ring of the angular contact rolling bearing with the bearing ring being axially movable relative to the housing.

BACKGROUND OF THE INVENTION

In rolling bearing arrangements comprising angular contact bearings for the mounting of shafts in vehicle transmissions, as a rule two of the angular contact bearings are biased lash-free against each other. In angular contact rolling bearing arrangements, lash-free biasing means that the angular contact bearings are biased both in radial and in axial direction and that at least movement lashes between the rolling elements and the bearing rings within the angular contact bearings are eliminated. Angular contact bearings are taper roller bearings or angular contact roller bearings or angular contact ball bearings.

The invention relates to all types of rolling bearing arrangements with which the shafts are mounted in housings made of materials having higher thermal expansion coefficients than the mounting elements and the mounted elements. The mounting elements are the angular contact bearings. The mounted elements are the shafts, gearwheels, differential cages or planet carriers which are mounted through the rolling bearing arrangement. As a rule, the housings are made out of light metals and their alloys. The mounting and the mounted elements are made as a rule out of steel.

As known, light metals have a higher thermal expansion coefficient than steel. Due to the differences in the thermal expansion coefficients, the housing made of light metal expands more than the mounting and the mounted elements when the temperature rises. As a result, the pre-stresses in the rolling bearing arrangements can be lowered or even nullified. The reduction of pre-stresses results in axial excursion of the biased bearing rings to the point of producing lashes in the bearings with a complete absence of pre-stresses. In addition, this phenomenon known in the technical field is intensified by the fact that the bores of the mounting seats in housings made of the materials possessing the higher thermal expansion coefficients widen radially more than the respective bearing ring arranged in the bore, so that the seats of the rolling bearings in the bores can likewise loosen to the extent of giving rise to radial lashes.

Arrangements also exist in which for compensating lashes, so-called lash compensation elements are used. Through these elements which are mostly spring-elastic, the rolling bearing arrangement is retained under permanent pre-stress. Spring excursion and pre-stress are large enough to compensate expansions even in regions of the largest possible movement lashes. Such spring-elastic elements are, for example, disk springs, ondular washers or coil springs that are clamped axially between one of the axially displaceable bearing rings of one of the angular contact bearings and an axial support fixed on a surrounding part.

As also described in U.S. Pat. No. 5,028,152 A, thermo compensation elements, also called TCE's are used in such rolling bearing arrangements. These TCE's are made of a material whose thermal expansion coefficient, as a rule, is much higher than that of the housing. The TCE's are seated on the outer periphery of the respective axially displaceable bearing ring and protrude in axial direction beyond the axially directed front end of the outer ring while being biased against an axial housing-mounted stop. Upon a rise of temperature in the surroundings of the rolling bearing arrangement, the TCE's, due to their higher thermal expansion coefficients, expand more than the housing, so that the axially protruding portion of the TCE lengthens in axial direction and the pre-stress in the rolling bearing arrangement is maintained. Because compared to steel and also to light metals, the TCE's are made of a relatively soft material they are encapsulated at least partially by a U-shaped ring profile. The ring profile is given the shape of the TCE's, and retains them in position while protecting them through axial stops in the contact zone particularly in the contact with the housing.

The housing described in U.S. Pat. No. 5,028,152 A is a ring profile that, in longitudinal section, is configured with a U-shape longitudinally along the central axis of the ring profile or along the central axis of the respective angular contact bearing. Viewed in any longitudinal section, the two legs of the U-profile are radially parallel to each other and are oriented in axial direction axially parallel to the central axis. The web that connects the legs is oriented in radial direction and thus crosswise to the central axis. The TCE is supported axially on the housing through the web.

In the rolling bearing arrangement described in U.S. Pat. No. 5,028,152 A, the bearing ring on which the TCE is seated must comprise a valley channel for this seat. By valley channel is to be understood a region on which two surfaces converge and form an inner corner. The surfaces in the present case are a circular ring surface and an outer cylindrical surface. The valley channel must possess axial and radial dimensions that correspond substantially to the dimensions of the TCE. Such a valley channel can be made in a bearing ring only if the bearing ring has adequate axial and radial dimensions: if not, the bearing capacity of the bearing ring is deteriorated because an insufficient quantity of material remains behind in the regions next to the raceways of the rolling elements for supporting the rolling contact of the rolling elements with the raceways. Frequently, the axial and the radial design space available for the accommodation of the angular contact bearing is tightly designed so that the dimensions of the bearing ring have no place for such valley channels. Moreover, for being able to receive the TCE's, the bearing rings must have generous radial and axial dimensions, and this has a detrimental effect on their material requirement and their weight.

SUMMARY OF THE INVENTION

The object of the invention is to provide a rolling bearing arrangement comprising at least one angular contact rolling bearing within a housing and at least one lash compensation element, in which rolling bearing arrangement the angular contact rolling bearing comprises a lash compensation element which is supported axially in one direction on the housing and is biased against an axially displaceable bearing ring of the angular contact rolling bearing, through which rolling bearing arrangement the aforesaid drawbacks are avoided.

The lash compensation element is at least partially encapsulated by a U-shaped ring profile and guided on the bearing ring through positive engagement for being radially immovable and axially displaceable relative to the bearing ring.

According to the invention, at least one axial section of the bearing ring on which the lash compensation element acts protrudes axially between the two axially directed legs of the U-shaped ring profile into the ring profile. For this purpose, the legs are situated radially opposite each other and receive the section radially between each other, so that one leg of the ring profile adjoins the section radially on the inner side and the other, opposing leg adjoins the section radially on the outer side. The legs may bear against the section in radial direction or be arranged with lash relative to the section. The section can be the axial ring-shaped end of the bearing ring, so that the lash compensation element bears axially against the front end of this bearing ring and at least the disk-shaped web between the legs of the U-shaped ring profile covers the front end of the bearing ring completely. Alternatively, the at least one section is formed by at least one, but also by two or more projections which protrude axially from the bearing ring. The one projection is a hollow cylindrical section whose radial dimension is smaller than that of the bearing ring or which has the same radial dimensions as the bearing ring. Preferably, the section has a hollow cylindrical configuration and can have the same radial dimensions as the shoulder of the bearing ring. Alternatively, the radial dimensions of the section can also be larger or smaller than those of the shoulder.

The bearing ring on which the ring profile is fixed by positive engagement is either an inner ring or, preferably, an outer ring.

The lash compensation element can be, for example, an elastic steel spring or a spring made of elastomer. Alternatively and preferably, the lash compensation element is a TCE possessing a temperature-dependent extensibility and made preferably out of a plastics material. The material of the lash compensation element has a different, preferably higher thermal expansion coefficient than a material out of which the housing is made. Alternatively or at the same time, the lash compensation element is made at least of one material that possesses a different thermal expansion coefficient from a material out of which the bearing ring is made.

According to one development of the invention, the lash compensation element bears in one direction axially against the bearing ring and in an opposite axial direction against a radially oriented cross-connection. The cross-connection is a radial connection that is to say, a preferably annular disk-shaped web between the legs of the ring profile. Thus, the TCE is encapsulated radially inwards and outwards, as also in direction of one front end, by the ring profile and in direction of the opposite front end, by the front end of the bearing ring.

The lash compensation element is connected by gluing (also vulcanization) or by fusion of material by welding to the bearing ring, or it is inserted loosely into the ring profile between the bearing ring and the web of the U-shaped ring profile. Alternatively, the TCE is frontally connected to the cross-connection. The cooperation of the TCE with the ring profile functions substantially due to the fact that the TCE can expand freely in axial direction within the ring profile.

The invention likewise concerns an angular contact rolling bearing in the form of a pre-assembled unit which is pre-assembled with the lash compensation element and the ring profile. For this purpose, the lash compensation element is either fixed by positive engagement on the bearing ring and the ring profile is then pushed axially onto the bearing ring, or the lash compensation element is inserted between the bearing ring and the ring profile, following which the ring profile is plugged onto the bearing ring.

The advantage of the invention resides particularly in the fact that such an arrangement does not require more radial design space than a prior art arrangement without lash compensation element and can thus be used in existing constructions, for example, in power take-off gears of automotive vehicles. Compared to prior art arrangements in which TCE's are used, the bearing rings are not weakened because it is no longer necessary to provide a valley channel in the dimensions of the TCE for accommodating the lash compensation element, but at the most, a recess in the thickness of the respective leg of the ring profile. Because the ring profile is preferably made of thin-walled sheet metal, the bearing ring is hardly weakened by this measure. In the dimensioning of the bearing rings therefore, the place for accommodating a TCE no longer needs to be taken into account, so that, under certain circumstances, the bearing rings can be designed with smaller dimensions. Consequently, the design space of the transmission can be reduced on the whole, while the weight is reduced and material requirement is kept at a lower level.

BRIEF DESCRIPTION OF THE DRAWINGS

The invention will now be described more closely in the following with reference to examples of embodiment.

FIG. 1 illustrates a rolling bearing arrangement of the present invention;

FIG. 1a illustrates detail Z of FIG. 1;

FIG. 2 illustrates a cross-sectional view of an alternative embodiment of a rolling bearing arrangement of the present invention; and FIG. 2a illustrates detail X of FIG. 3.

DETAILED DESCRIPTION OF THE INVENTION

FIG. 1 shows a rolling bearing arrangement 1 comprising at least one angular contact rolling bearing 2 in a housing 3 and a lash compensation element 4 in the form of a TCE 16 in a longitudinal section along the axis of rotation 10. The TCE 16 is made of a material that has a different thermal expansion coefficient from the materials of which the housing 3 and the angular contact bearing 2 as also a shaft 15 are made. FIG. 1a shows the detail Z with a longitudinal section through the junction of the TCE 16 and a bearing ring 6 of the angular contact rolling bearing 2.

The angular contact rolling bearing 2 comprises an inner bearing ring 5 and an outer bearing ring 6. Rolling elements 27 in the form of balls are arranged radially between the bearing rings 5 and 6 and are supported on raceways 7 and 8. The TCE 16 is supported in one axial direction on an axial support 9 of the housing 3 and can be biased or is biased in the other axial direction against the outer bearing ring 6 that is axially displaceable relative to the housing in alignment with the axis of rotation 10.

On the radially inner side, the radially outer side and on the front end directed toward the axial support 9, the TCE 16 is encapsulated by a U-shaped ring profile 11 and bears on the front side directed towards the angular contact rolling bearing 2 against a front end surface 6a of the outer bearing ring 6 or is fixed on this by fusion of materials. In this way, the TCE 16 is partially encapsulated from two radial directions and one axial direction by the ring profile 11 and retained radially unmovable on the bearing ring 6 by the ring profile by 11 by positive engagement. In axial direction, the TCE 16 has a variable shape which, in the present case, means that the TCE 16 is guided on the bearing ring 6 so as to be able to expand or contract in its axial dimensions. During expansion and contraction, the legs 11a and 11b of the U-shaped ring profile 11 move axially relative to the outer bearing ring 6 along the outer bearing ring 6 but without losing contact with the section of the bearing ring.

For establishing positive radial engagement between the ring profile 11 and the bearing ring 6, at least one section 6b of the bearing ring 6 projects axially out of the bearing ring 6 and axially into the U-shaped ring profile 11. The section 6b bears between the two axially oriented legs 11a and 11b radially, at least partially, against the ring profile 11. In axial direction, the TCE 16 bears against a radially directed cross-connection, i.e. against the web 11c, and presses this axially against the support 9. The radial dimension, i.e. the radial wall thickness S of the section 6b is smaller than the radial dimension A of the shoulder 6c of the outer bearing ring at least by the sum of the radial sheet metal thicknesses of the legs 11a and 11b. In this way, it is assured that the legs 11a and 11b do not protrude in the radial directions of the angular contact bearing 2 beyond the contour of the outer bearing ring 6 and this is especially of importance for the mounting of the pre-assembled angular contact bearing 2 into the uniformly cylindrical bearing seat 14.

FIG. 2 shows in a longitudinal section along the axis of rotation 10, an angular contact rolling bearing 17 comprising a lash compensation element possessing temperature-dependent extensibility and made in the form of a TCE 18 out of a plastics material and that has a higher thermal extension coefficient than steel and aluminum alloys. FIG. 2a shows the detail X in a longitudinal section through the junction of the TCE 18 with a section 19a of a bearing ring 19 of the angular contact rolling bearing 17.

The angular contact rolling bearing 17 comprises an inner bearing ring 5 and the outer bearing ring 19. Rolling elements 27 in the form of balls are arranged radially between the bearing rings 5 and 19 while being supported on raceways 7 and 8. The TCE 18 is arranged axially between a front end 19b of a hollow cylindrical section 19a projecting axially out of the bearing ring 19 and a web 20a of a ring profile 20. The ring profile 20 is profiled in a U-shape and comprises two axially directed legs 20b and 20c which extend axially parallel to the axis of rotation. The TCE 18 guided radially inward and radially outward by the legs 20b and 20c through which the ring profile is plugged axially onto said section. The TCE 18 is variable in shape in axial direction, which, in the present case, means that its axial dimensions can expand or contract. During expansion and contraction, the legs 20b and 20c of the ring profile 20 move axially relative to the outer bearing ring 19 along the outer bearing ring 6.

For making the section 19a, only that much material of the bearing ring 19 is removed from the thickness A from the radially outer side, that the dimensions b of the thus formed shoulder correspond at least to the thickness of the sheet metal of the leg 20b, but not much more than these dimensions. In this way, it is assured that the ring profile 20 does not protrude radially beyond the outer diameter of the outer bearing ring 19 and mounting of the angular contact rolling bearing 17 in a continuous inner cylindrical bore can be performed. The bearing capacity of the outer bearing ring 19 is hardly affected by this measure. The leg 20c projects radially inward by the measure B beyond the inner cylindrical peripheral surface of the section 19a into the radial annular gap between the two bearing rings 6 and 19. This does not have a detrimental effect on the stability of the bearing ring 19 but rather a positive effect because, in this way, the bearing ring is not weakened at this point by removal of material.

What is claimed:

1. A rolling bearing arrangement, comprising:
    at least one angular contact rolling bearing arranged within a housing, the angular contact rolling bearing having a bearing ring with a raceway for a rolling element, the bearing ring having at least one moveable section that is axially moveable relative to the housing;
    at least one lash compensation element, which is supported axially in one direction on the housing and supported on the bearing ring so as to be axially variable in shape relative to the bearing ring such that the lash compensation element is capable of being biased against a front surface of the bearing ring of the angular contact rolling bearing; and
    a U-shaped ring profile, which has two radially opposing legs directed in an axial direction, at least partially surrounding the lash compensation element, rendering the lash compensation element radially immoveable by positive engagement,
    the bearing ring having a shoulder between the raceway and the front surface, the shoulder having a circumferential outer contour forming an outer diameter of the bearing ring and the circumferential inner contour forming an inner diameter of the bearing ring, wherein a section of the shoulder at the front surface has a radially outer diameter that is smaller than said outer diameter of the bearing ring, a radially outer leg of the legs is received in the section of the shoulder such that the U-shaped ring profile does not protrude radially beyond the outer diameter of the bearing ring, and a radially inner leg of the legs projects radially inward of the inner diameter of the inner contour.

2. The rolling bearing arrangement according to claim 1, wherein the lash compensation element bears in one direction axially against the bearing ring and in an opposite axial direction against a radially directed cross-connection between the legs of the ring profile.

3. The rolling bearing arrangement according to claim 1, wherein the section of the shoulder is a cylindrical section, and the lash compensation element is encapsulated in two radial directions and in one axial direction by the ring profile and in a further axial direction on a front end of the lash compensation element by the bearing ring, and the cylindrical section of the bearing ring plunges axially between the legs so that each of the legs bears in one radial direction against the cylindrical section.

4. The rolling bearing arrangement according to claim 1, wherein the lash compensation element is connected by fusion of materials to the bearing ring.

5. The rolling bearing arrangement according to claim 1, wherein the lash compensation element is made at least of one material that has a different thermal expansion coefficient from a material of which the housing is made.

6. The rolling bearing arrangement according to claim 1, wherein the lash compensation element has a thermal expansion coefficient that is different from a thermal expansion coefficient of the bearing ring.

7. The rolling bearing arrangement according to claim 1, wherein the lash compensation element has a thermal expansion coefficient that is at least higher than a thermal expansion coefficient of the bearing ring.

8. An angular contact rolling bearing, comprising:
    at least one lash compensation element possessing temperature-dependent extensibility;
    a bearing ring having a raceway for a rolling element; and
    a U-shaped ring profile having two radially opposing legs directed in an axial direction, the ring profile rendering the lash compensation element radially immovable by positive engagement while being guided on the bearing ring of the angular contact rolling bearing for axial displacement relative to the bearing ring, and the at least one axial section of the bearing ring projecting axially between the legs of the ring profile, the bearing ring further comprising a shoulder between the raceway and the front surface of the bearing ring, the shoulder having a circumferential outer contour forming an outer diameter of the bearing ring and the circumferential inner contour forming an inner diameter of the bearing ring, wherein a section of the shoulder at the front surface has a radially outer diameter that is smaller than said outer diameter of the bearing ring, a radially outer leg of the legs is received in the section of the shoulder such that the U-shaped ring profile does not protrude radially beyond the outer diameter of the bearing ring, and a radially inner leg of the legs projects radially inward of the inner diameter of the inner contour.

9. The rolling bearing arrangement according to claim 8, wherein the lash compensation element bears in one direction axially against the bearing ring and in an opposite axial direction against a radially directed cross-connection between the legs of the ring profile.

10. The rolling bearing arrangement according to claim 8, wherein the lash compensation element is a thermo compensation element which is made at least of one material that has a different thermal expansion coefficient from a material of which the housing and/or the bearing ring is made.

* * * * *